Oct. 27, 1925.
J. G. PRESSLER
1,558,503
HOSE CONNECTION FOR AUTOMOBILE ENGINES AND RADIATORS
Filed Oct. 6, 1921   2 Sheets-Sheet 1
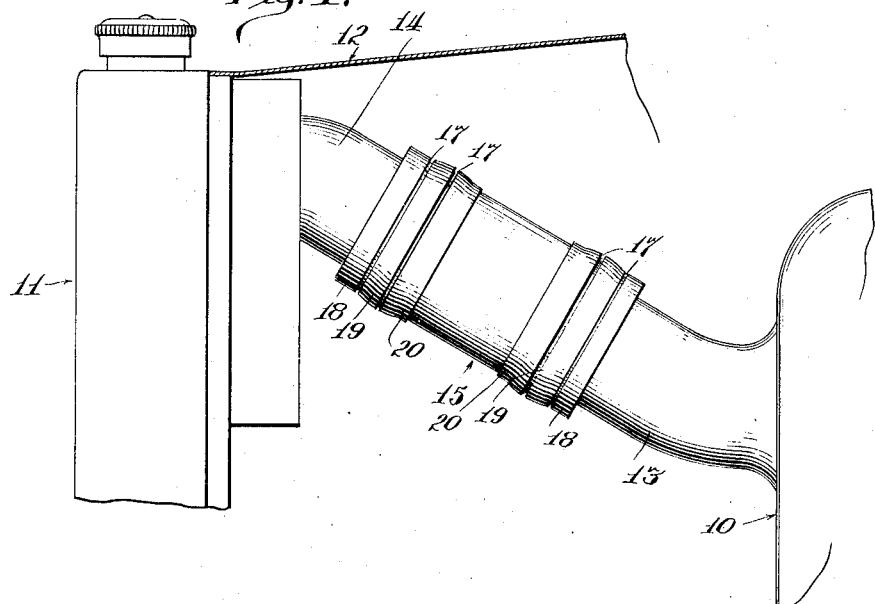
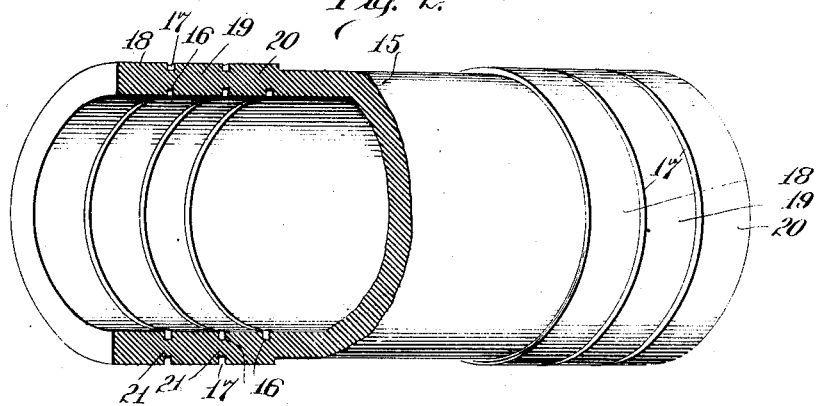
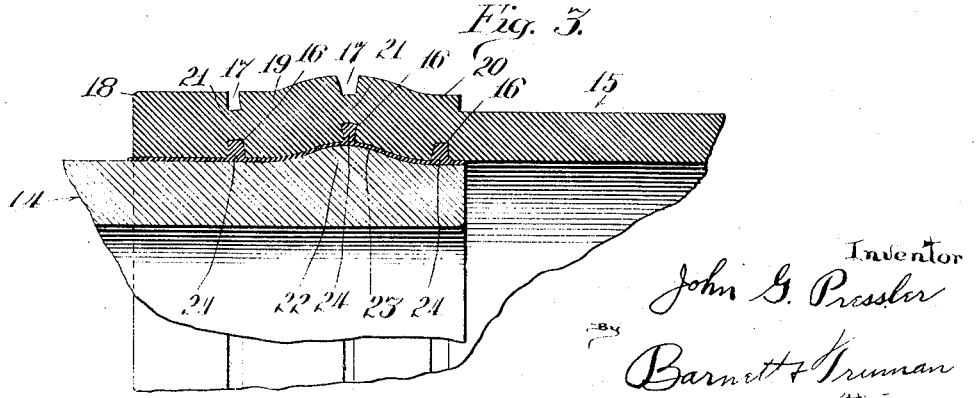
Inventor
John G. Pressler
By Barnett & Truman
Attorneys Oct. 27, 1925.  
J. G. PRESSLER  
1,558,503  
HOSE CONNECTION FOR AUTOMOBILE ENGINES AND RADIATORS  
Filed Oct. 6, 1921  2 Sheets-Sheet 2
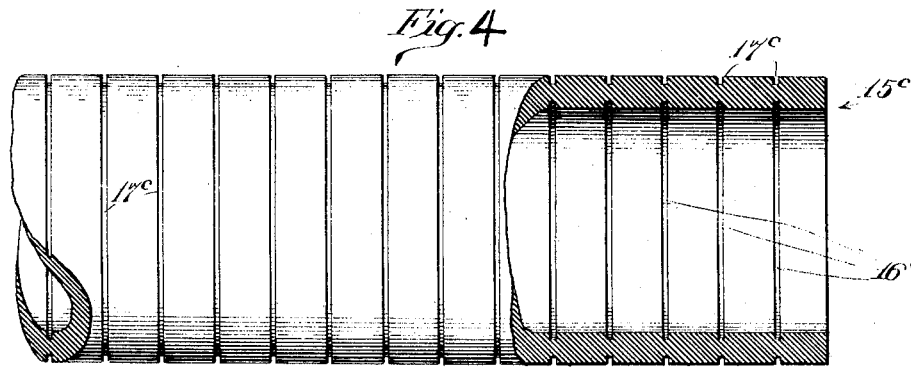

Patented Oct. 27, 1925.

1,558,503

UNITED STATES PATENT OFFICE.

JOHN G. PRESSLER, OF CHICAGO, ILLINOIS.

HOSE CONNECTION FOR AUTOMOBILE ENGINES AND RADIATORS.

Application filed October 6, 1921. Serial No. 505,705.

*To all whom it may concern:*

Be it known that I, JOHN G. PRESSLER, a citizen of the United States, residing at Chicago, in the county of Cook and State of Illinois, have invented certain new and useful Improvements in Hose Connections for Automobile Engines and Radiators, of which the following is a specification.

My invention relates to hose connections for conduits, and more particularly to flexible connections of this character suitable for use in connecting the water jackets of an internal combustion engine with its water cooling system or radiator tank.

A primary object of this invention is to provide a new and improved hose connection which may be readily applied to adjacent ends of conduits so as to provide a connection that will be maintained fluid-tight without the use of clamping devices, which will not be subjected to excessive wear or be loosened by the vibration of the connecting parts, and which will resist the various other disturbing and deteriorating influences to which hose connections of this character are subjected while in service.

Prior to my invention, hose of a fabricated construction consisting of layers of cloth and rubber, have been extensively used for connecting the water jackets of automobile engines with the radiator tank of the automobile, and in some cases hose made entirely of rubber have been used for this purpose. The fabric and rubber hose heretofore used have not been considered entirely satisfactory, for the reason that the fabricated hose deteriorates very rapidly by reason of the stresses produced by the vibration of the automobile, or by the relative movement of the radiator tank and engine in automobiles of the heavier construction, in which the radiator of the automobile is supported on springs independently of the engine. The hose made entirely of rubber, heretofore used, while being more flexible than the fabricated hose, presents certain other disadvantages which this invention is intended to overcome. One of these disadvantages is that the hose are either relatively thick and stiff throughout or their ends are formed with relatively wide, thick portions. These relatively wide and stiff end portions of the hose make them difficult to apply and also prevent them from readily conforming to any irregularities in the contours of the conduits, thereby failing, in many instances, to provide a fluid tight seal between the outside wall of the conduit and the inside wall of the hose.

The invention is illustrated in certain preferred embodiments in the accompanying drawings, wherein—

Fig. 1 is a fragmentary view in elevation of an automobile engine and radiator, showing a hose connection made in accordance with my invention, employed to connect the water jacket of the engine with the radiator;

Fig. 2 is a view in perspective, partly in section, illustrating the construction of the hose member shown in Fig. 1;

Fig. 3 is a fragmentary sectional view, made on a larger scale, showing the hose applied to a radiator stub of the type formed with a bead on its outer surface; and Fig. 4 is a view partly in section, of a modified style of hose.

Like characters of reference designate corresponding parts in the several figures of the drawings.

In the drawings I have shown my improved hose connection employed to connect the water jacket of an automobile engine with the radiator tank, and the advantages of the invention will be pointed out in connection with this specific use. It will be obvious, however, that it can be used to an equal advantage in other situations where analogous conditions prevail, without departure from the spirit of my invention.

Referring first to Figs. 1, 2 and 3 of the drawings, 10 designates an automobile engine, 11 the radiator tank, 12 the automobile hood, 13 a conduit stub leading from the water jacket of the engine 10, 14 a conduit stub leading into the upper end of the radiator tank, and 15 a flexible hose connection applied to adjacent ends of the conduit stubs 13 and 14 to connect the water jacket of the engine with the radiator, whereby the cooling fluid may pass into the upper portion of the radiator tank.

The hose 15 is made preferably of live rubber (although by the term "rubber" I intend to include the usual rubber substitutes or mixtures of pure rubber and rubber substitutes) of sufficient thickness to withstand the internal pressure to which it will ordinarily be subjected, and also has sufficient flexibility to permit it to readily respond to relative movements of the conduit stubs, for example, such as may result from vibration of the automobile parts or other causes The passage through the rubber hose is normally smaller in diameter than the conduit stubs or pipes to which they are intended to be applied, so that it is necessary to dilate the openings of the hose when they are fitted over the conduit stubs. The resiliency of the rubber, having a tendency to return to the position from which it was stretched, will exert a firm grip on the conduit stubs.

In order to increase the grip of the hose on the conduit stubs 13 and 14 without impairing or reducing the desired flexibility of the middle portion of the hose, its ends are preferably made thicker than the middle portion. With this construction the hose will maintain a firm grip on the conduit stubs without the use of clamps or other forms of retaining devices.

In hose connections of the above character, having relatively heavy end portions, I preferably increase the flexibility of the ends so that the hose connection will present, among other advantages, the advantage of being readily and conveniently applied to its operative position. This desired flexibility is preferably provided by forming the portions of increased thickness with one or more annular recesses, grooves or kerfs of suitable depth. Such recesses may be formed in the inner or outer surfaces of the hose, or if desirable, they may be formed in both of such surfaces. In Figs. 1 to 3 inclusive of the drawings, I have shown the end portions of the hose 15 formed on their inner and outer surfaces with a series of grooves 16 and 17, respectively. The grooves 16 and 17 are preferably, though not necessarily, disposed opposite to each other. By arranging the grooves in this manner, the ends of the hose are in effect divided into a series of relatively heavy, narrow bands 18, 19 and 20 the inner surfaces of which are cylindrical and which are connected by narrower sections of considerably less thickness. This construction makes the hose more easily applied than the hose couplings having relatively stiff ends, in that each of the separate bands 18, 19 and 20 may, when forced over the conduit stubs 13 and 14, be dilated independently of the other. In addition to the above features, the thick separated bands, or sections being relatively narrow in width and connected by thinner, more flexible webs 21, will allow the ends of the hose to readily conform to undulations, and other irregularities, in the contours of conduit stubs. The bands, moreover, exert separate and independent grips on said stubs, thereby forming a series of separate and independent seals to prevent leakage or evaporation of the cooling fluid passing through the conduit. They also allow the hose to be readily compressed and elongated in the direction of its length, for example, when the radiator vibrates toward and from the engine, the form of the connector minimizing the destructive effects of such vibratory movements.

For the purpose of illustrating a typical installation the hose is shown in Fig. 3 as applied to a conduit stub having a bead 22 on its outer surface.

In applying hose connections of the character now extensively used for the above purpose, it is customary to first apply a coating of some suitable compound, for example, white lead or shellac, to the inner surface of the hose or to the outer surface of the conduit stubs. When this custom is carried out in connection with the use of my invention, the compound 23 (shown in Fig. 3) will find entrance to the inner recesses 16 of the hose 15, and become hardened therein thereby providing outwardly projecting ridges 24 which interlock with the internal recesses of the hose in a manner to resist any tendency that the vibration or other disturbing influences may have to loosen or move longitudinally on the conduit stubs. Such ridges also form separate seals intermediate the separate bands 18, 19 and 20 of the hose so as to prevent the cooling liquid from leaking out or around the interlocked surfaces.

In Fig. 4 I have shown a modification in which the hose may be formed in any convenient length, from which hose connections of any desired length may be cut. In this modification the hose is separated into relatively heavy separate bands throughout its entire length. The grooves shown in this figure for separating said bands are designated 16ᶜ and 17ᶜ, respectively, and since they are formed throughout the entire length of the hose, connections of any suitable length having maximum flexibility throughout may be cut from either end of the hose.

In addition to meeting the commercial demands requiring flexible connections of various lengths, hose connections of the above character having separate bands throughout their entire or part of their length present the advantage of having maximum resiliency in the direction of their length, which resiliency will absorb the stresses incident to the jerks and thrusts longitudinally of the hose, the separate bands being moved apart or compressed together in response to the particular stress to which the hose is subjected. The connector will also bend easily without cramping, the flexure being distributed throughout the length of the hose. That is, the bending will take place at each groove, the thin circular web between adjacent cylindrical bands of maximum thickness being compressed on one side of the hose and stretched on the other without any appreciable deformation of the bands so-called. This adds to the life of the connector and when the latter is bent, unless the bending is excessive, the port through the connector will have the same circular cross section throughout its length.

While I have described my invention in connection with certain preferred embodiments, I wish it understood that I do not limit my invention to the embodiments shown and described, except in so far as specific limitations may appear in the appended claims.

Claims:

1. In a flexible connection of the character described, the combination with separate conduit sections, of means for providing a fluid-tight connection for said sections comprising an all rubber tube the passage through which is of less diameter than the external diameter of said sections and is dilated when the tube is in its applied position; said tube being provided in its inner and outer surfaces with a series of oppositely disposed recesses whereby said tube is, in effect, divided into a series of bands.

2. In a flexible connection of the character described, the combination with separate conduit sections, of means for providing a fluid-tight connection for said sections comprising an all rubber tube having end portions thicker than the middle portion and formed with a series of oppositely disposed grooves in the inner and outer surfaces thereof which, in effect, divide said end portions into a series of separate bands adapted to be dilated independently of each other during the application of the tube to its operative position and grip said conduit sections at a plurality of separate points.

3. In a flexible connection of the character described, the combination with separate conduit sections, of means for providing a fluid-tight connection for said sections comprising an all rubber tube having a passage therethrough of less diameter than the external diameter of said conduit sections and provided with end portions thicker than the middle portion and formed with a series of oppositely disposed grooves in the inner and outer surfaces thereof which, in effect, divide said end portions into a series of separate bands adapted to separately grip each conduit section at a plurality of points; whereby said end portions will conform with irregularities in the contours of said conduit sections.

4. A flexible rubber hose connector for making a connection of the type described, formed on its inner surface with a plurality of closed annular grooves and between said grooves with wider cylindrical surfaces adapted to bear upon and frictionally grip the conduit members which the hose connects.

5. A flexible rubber hose connector for making a connection of the type described having a relatively thin center portion and end portions of greater thickness, said end portions being formed on their inner surfaces with a plurality of closed annular grooves and between said grooves with wider cylindrical surfaces adapted to bear upon and frictionally grip the conduit members which said hose connects.

6. A flexible rubber hose connector for making a connection of the type described, formed on its inner and outer surfaces with oppositely disposed annular grooves arranged to provide bands of considerable thickness and having cylindrical inner surfaces to frictionally grip the conduit members between which said hose is placed connected by intervening webs of lesser width than thickness.

7. A flexible rubber hose connector for making a connection of the type described having a relatively thin center portion and end portions of greater thickness, said end portions being formed on their inner and outer surfaces with oppositely disposed annular grooves arranged to provide bands of relatively considerable thickness and width to frictionally grip the conduit members between which said hose is placed, connected by intervening webs of lesser width than thickness.

8. A flexible rubber hose connector for making a connection of the type described formed on its inner and outer surfaces with annular grooves to give the hose increased flexibility, the inner grooves dividing the inner face of said hose into a plurality of spaced cylindrical surfaced bands to frictionally grip the conduit members which the hose connects.

9. A flexible rubber hose connector for making a connection of the type described, the ends of which are formed with interior, cylindrical surfaces of substantial width for frictionally gripping the conduit elements which the hose connects, and one surface of which is formed with a plurality of spaced closed annular grooves.

10. A flexible rubber hose connector for making a connection of the type described, the ends of which are formed with interior, cylindrical surfaces of substantial width for frictionally gripping the conduit elements which the hose connects and one surface of which is formed with a plurality of spaced closed annular grooves the width of which is small relative to the width of the intervening surfaces.

11. A flexible rubber hose connector for making a connection of the type described, formed with a plurality of annular interior grooves normal to the axis of the connector which provides the end portions of the hose with bands having cylindrical surfaces of substantial width, for frictionally engaging the conduit members connected by the hose, and with webs intervening between the bands of less thickness than the bands to give these portions of the hose increased flexibility.

12. A flexible rubber hose connector for making a connection of the type described formed with a plurality of annular grooves normal to the axis of the connector having a width less than the distance between adjacent grooves so as to divide said connector into cylindrical bands of maximum thickness connected by intervening webs of lesser thickness.

13. A connector made wholly of rubber and formed so as to provide a plurality of cylindrical bands of maximum thickness and intervening annular webs normal to the axis of the connector of lesser thickness and less width than said bands.

JOHN G. PRESSLER.